（12）United States Patent
Raiche et al.

(10) Patent No.: US 8,294,064 B1
(45) Date of Patent: Oct. 23, 2012

(54) FLOATING ELECTRODE ASSEMBLY AND AUTOMATED SYSTEM AND METHOD FOR WELDING PROJECTION WELD NUTS

(75) Inventors: Matthew Raiche, Dublin, OH (US); Masaomi Kataiki, Tochigi-ken (JP); Kevin Schnipke, Prospect, OH (US)

(73) Assignee: Honda Motor Co., Ltd., Tokyo (JP)

( * ) Notice: Subject to any disclaimer, the term of this patent is extended or adjusted under 35 U.S.C. 154(b) by 356 days.

(21) Appl. No.: 12/727,011

(22) Filed: Mar. 18, 2010

(51) Int. Cl.
*B23K 9/00* (2006.01)
(52) U.S. Cl. ............... 219/136; 219/137 R; 219/137.2; 219/137.31; 219/145.1; 219/145.21
(58) Field of Classification Search ............... 219/136, 219/137 R, 137.2, 137.31, 137 PS, 137 WM, 219/145.1, 145.21
See application file for complete search history.

(56) References Cited

U.S. PATENT DOCUMENTS

| | | | |
|---|---|---|---|
| 5,705,784 A | 1/1998 | Aoyama et al. | |
| 6,008,463 A | 12/1999 | Aoyama et al. | |
| 6,163,004 A | 12/2000 | Aoyama et al. | |
| 6,303,893 B1 | 10/2001 | Perks | |
| 6,337,456 B1 * | 1/2002 | Taniguchi et al. | 219/86.25 |
| 6,576,859 B2 | 6/2003 | Cabanaw | |
| 6,624,379 B1 | 9/2003 | Thornton et al. | |
| 6,875,946 B2 | 4/2005 | Hidaka | |
| 6,906,279 B2 | 6/2005 | Cabanaw | |
| 7,250,585 B1 | 7/2007 | Tsuchiya et al. | |
| 2005/0150874 A1 | 7/2005 | Cabanaw et al. | |

* cited by examiner

*Primary Examiner* — Long Tran
(74) *Attorney, Agent, or Firm* — Standley Law Group LLP (57) ABSTRACT

An electrode assembly and welding system and method. An electrode assembly preferably includes an electrode mounting block, a weld electrode disposed in said mounting block with a first end extending therefrom for contact with a work piece or a projection weld nut, an insulating bushing separating the weld electrode from direct contact with the mounting block, and a contacting electrode floatingly installed into a receiving cavity located in a second end of the weld electrode, the contacting electrode provided for contact by a gun arm electrode of a weld gun. A system and method of the present invention makes use of cooperating electrode assemblies to weld projection weld nuts to a fixtured work piece. Welding current is transferred from the electrodes of a weld gun to the projection weld nut(s) and work piece via the contacting electrodes and weld electrodes of associated electrode assemblies.

17 Claims, 5 Drawing Sheets

FLOATING ELECTRODE ASSEMBLY AND AUTOMATED SYSTEM AND METHOD FOR WELDING PROJECTION WELD NUTS

BACKGROUND OF THE INVENTION

The present invention is directed to an improved electrode assembly and to a system and method for welding projection weld nuts to a work piece therewith.

Projection weld nuts are well known to those of skill in the art. In brief, projection weld nuts are generally threaded nuts designed especially for attachment to a metallic work piece via resistance welding. To facilitate welded attachment, projection weld nuts include several portions of weld material that project outward from a welding face (i.e., the face of the projection weld nut that will contact the work piece). The projection weld nut is placed into contact with a work piece, typically in or over a pilot hole, pressure is preferably applied, and a resistance welding apparatus is used to pass current through the work piece and the projection weld nut. The current causes a melting of the weld material projections and a welding of the projection weld nut to the work piece.

In a typical projection weld nut welding process, a projection weld nut is located to a work piece for welding. The work piece is often maintained in the welding position by hand. Welding is typically accomplished by use of a specialized fixed position resistance welding device that includes a pair of electrodes designed to apply pressure to the projection weld nut and work piece and to pass current through the work piece and the projection weld nut. For example, a first electrode may be provided to contact a top surface of the work piece while a second electrode is provided to contact the projection weld nut, which is maintained in contact with the underside of the work piece. Each of the electrodes is normally pressed against the work piece by an actuator, such as a hydraulic or pneumatic cylinder.

The problem with such a system is that it requires specialized equipment (e.g., a stationary pedestal welder) unique to the work piece at issue, and also commonly necessitates much handling by an operator. In contrast, the present invention allows projection weld nuts to be attached to a work piece using a weld gun, such as a servo weld gun. This would then permit the use of a welding robot or other manipulator, which can be easily adapted for use with work pieces of varying size and/or shape so as to eliminate the need for a specialized resistance welding apparatus and minimize operator handling of work pieces to which weld nuts will be attached.

The system and method of the present invention further eliminates other problems commonly associated with the welding of projection weld nuts. For example, a system and method of the present invention automatically compensates for weld tip wear and permits a positional adjustment of a sheet metal work piece in up to three directions without causing any welding problems.

SUMMARY OF THE INVENTION

A system of the present invention generally comprises a weld gun in combination with a work piece fixture for supporting a work piece. A pair of electrode assemblies are provided at each weld nut location for transferring electric current from the weld gun to the projection nut(s) and work piece. The present invention allows for the elimination of, or a reduction in, work piece handling on the part of an operator. The system and process of the present invention also permits the welding of projection weld nuts to a wide variety of work pieces without the need to design and construct complex dedicated welding devices. Rather, a single weld gun-wielding robot in combination with one or more simple fixtures can be used to accomplish the welding of projection weld nuts to a wide variety of work pieces.

Further, the present invention employs an improved electrode assembly design that provides for automatic weld tip wear compensation. Particularly, the present invention employs a floating electrode assembly design. Preferably, the present invention also employs fully insulated electrode assemblies that, in turn, allow for significant adjustment of a metal work piece without causing heat buildup, bushing melt, or other problems during welding.

In one embodiment of the present invention, a weld gun is associated with a welding robot. Various types of such weld guns exist, but use of a servo weld gun is preferred. The welding robot is used in conjunction with a fixture for properly supporting the work piece of interest, and upper and lower electrode assemblies for transferring electric current from the weld gun to the projection nut(s) and work piece. The weld gun contacts a contacting electrode of the upper and lower electrode assemblies during a welding cycle, while applying pressure and welding current to the projection weld nut(s) and work piece.

The work piece fixture may include a bracket or other structure that supports the lower electrode assembly. Alternatively, a separate lower electrode assembly support may be provided. The lower electrode assembly includes a lower weld electrode for contacting a work piece or a weld nut, and a lower contacting electrode provided for contact with a corresponding electrode of a weld gun and for transferring current therefrom through the lower weld electrode to the work piece and projection weld nut. The lower contacting electrode is floatingly installed to the lower weld electrode as is described in more detail below.

An upper electrode assembly support member may also be provided to locate and support the upper electrode assembly. The upper electrode support member is generally moveable. For example, the upper electrode support may pivot or extend in order to clear the work piece as it is loaded onto a work piece fixture. The upper electrode assembly includes an upper weld electrode for contacting a work piece or a weld nut, and an upper contacting electrode that is preferably identical to the lower contacting electrode and is provided for contact with a corresponding electrode of a weld gun and for transferring current therefrom through the upper weld electrode to the work piece and projection weld nut. The upper contacting electrode is floatingly installed to the upper weld electrode as is described in more detail below.

Operation of such an exemplary embodiment of a system of the present invention may include: locating a projection weld nut to each lower weld electrode; placing a work piece on the fixture; moving the upper electrode assembly support members to place the associated upper electrode assemblies into proper welding position, whereby the upper weld electrode of each such assembly is in contact with a top surface of the work piece; sequentially using the weld gun to apply pressure to the upper and lower contacting electrodes of each electrode assembly pair and, thereby, the projection weld nut(s) and work piece; and, using the weld gun to apply a welding current to weld each projection weld nut to the work piece.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
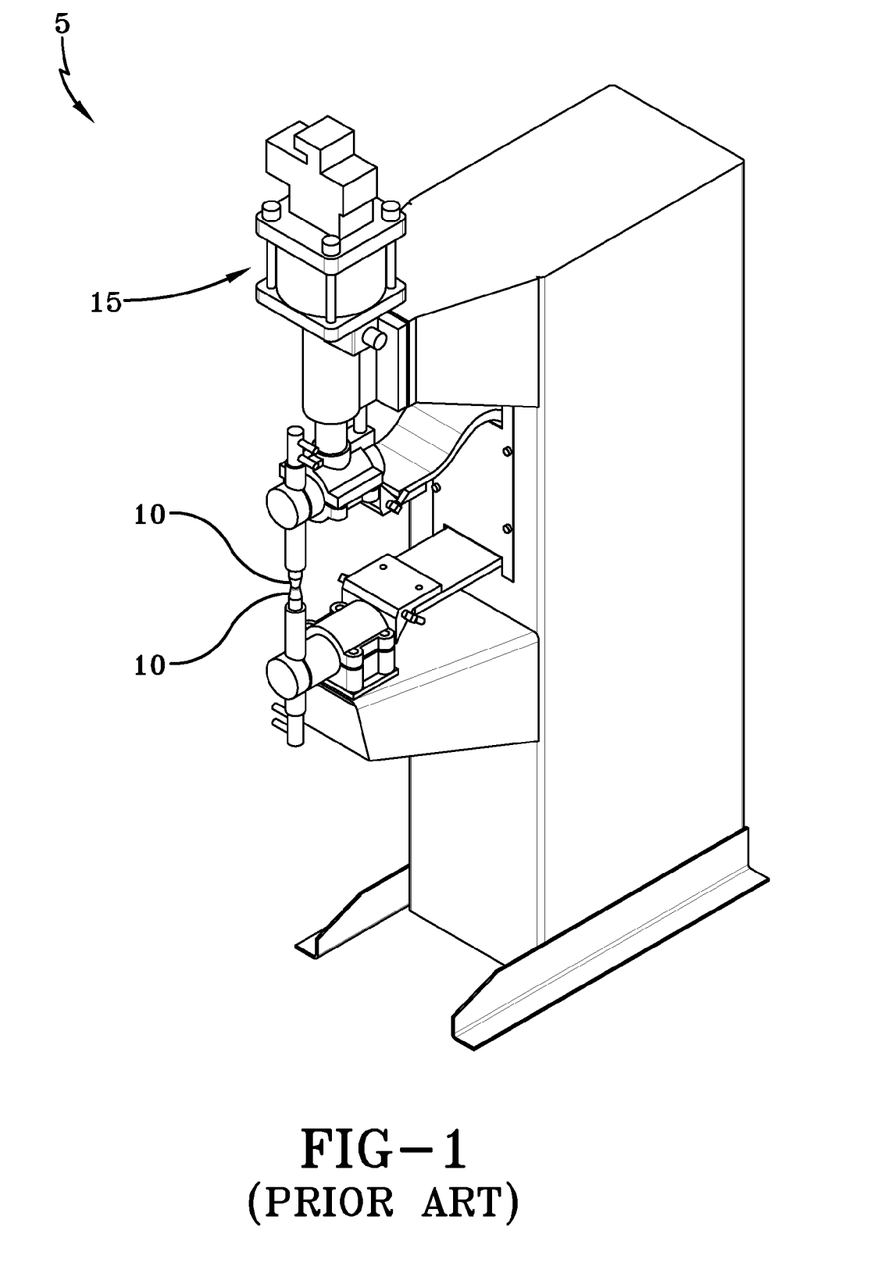
FIG. 1 depicts a typical known stationary pedestal welder as may be used in the art to weld a projection weld nut to a metallic work piece.

As can be understood from a review of FIG. 1, known systems for welding projection weld nuts typically require considerable interaction by an operator, as well as dedicated equipment designed for a particular application. As shown, such a known welding system may include one or more stationary pedestal welders 5. Such a pedestal welder is typically equipped with a pair of opposed weld electrodes 10, at least one of which may be movable by an actuating cylinder 15 or similar device. With such a device, an operator is commonly required to manually position a work piece between the electrodes 10 and then activate the actuating cylinder 15, such as by stepping on a footswitch or activating some other suitable process initiating device. This causes one or both weld electrodes of the pedestal welder 5 to advance and press against a projection weld nut and the work piece, whereafter electric current is passed through the projection weld nut and work piece to weld the projection nut thereto. This process would be repeated for each projection weld nut associated with the work piece, and may require the use of more than one pedestal welder.

Figure 2:
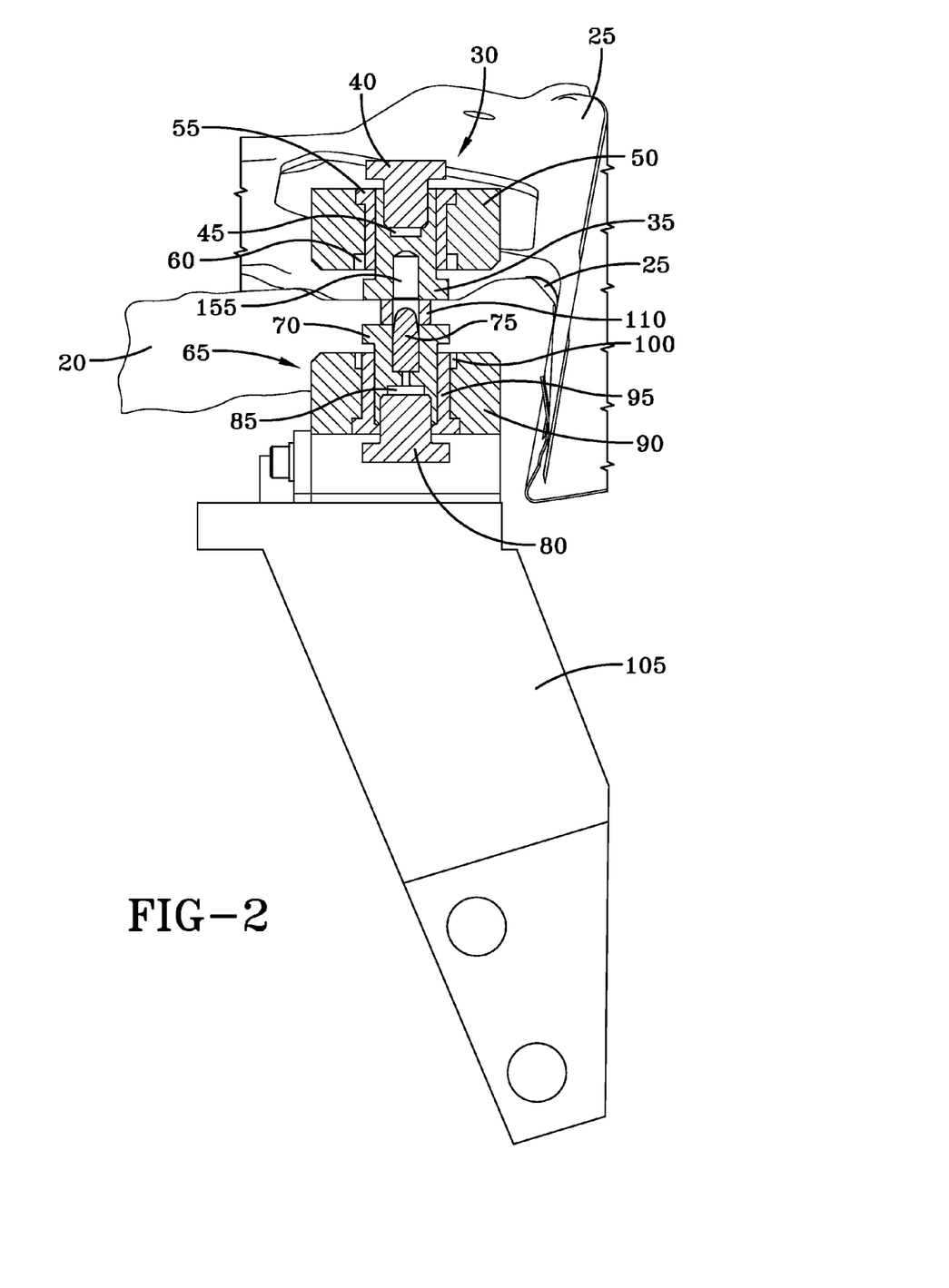
FIG. 2 illustrates a work piece arranged between a pair of electrode assemblies of the present invention.
Figure 3A:
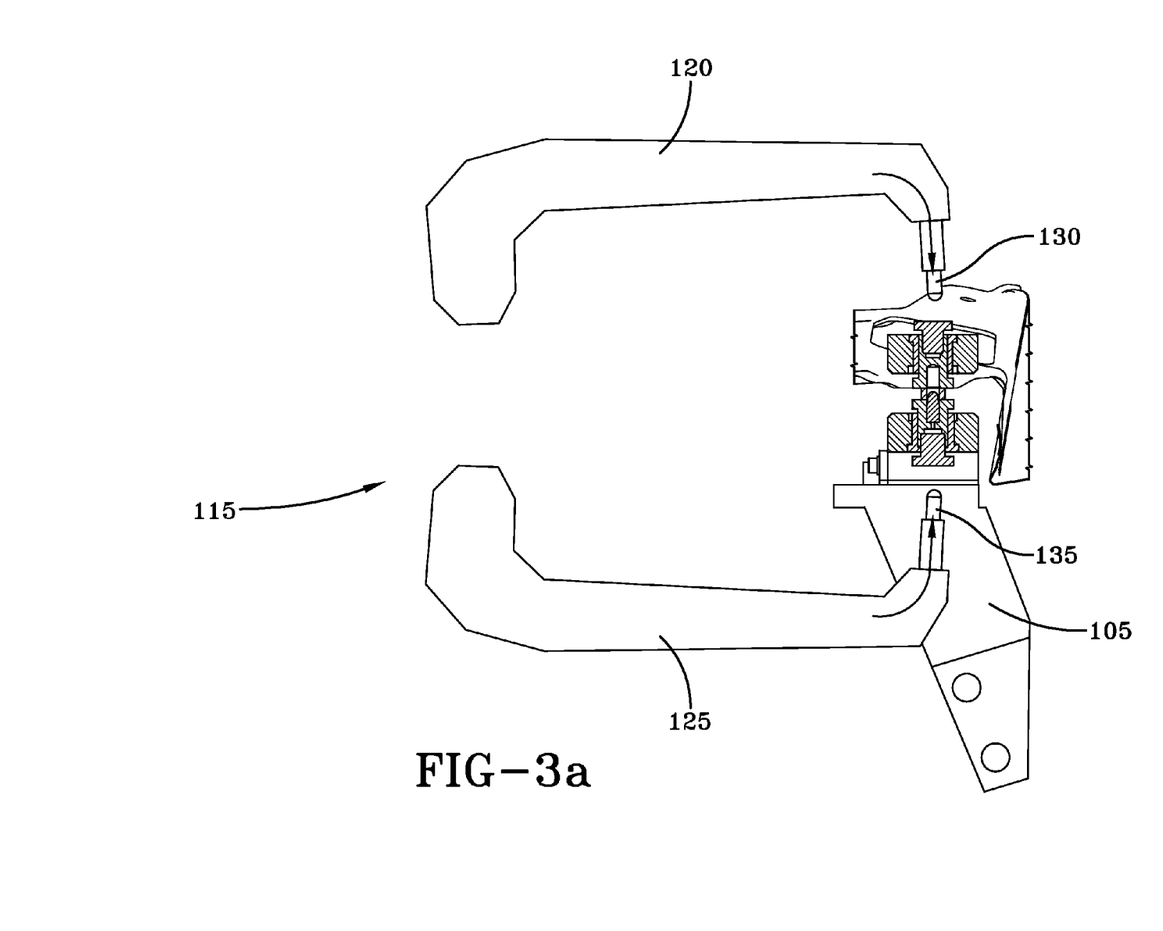
FIG. 3a shows the gun arms and gun arm electrodes of an exemplary weld gun located in a pre-welding position with respect to the electrode assemblies of FIG. 2.
Figure 3B:
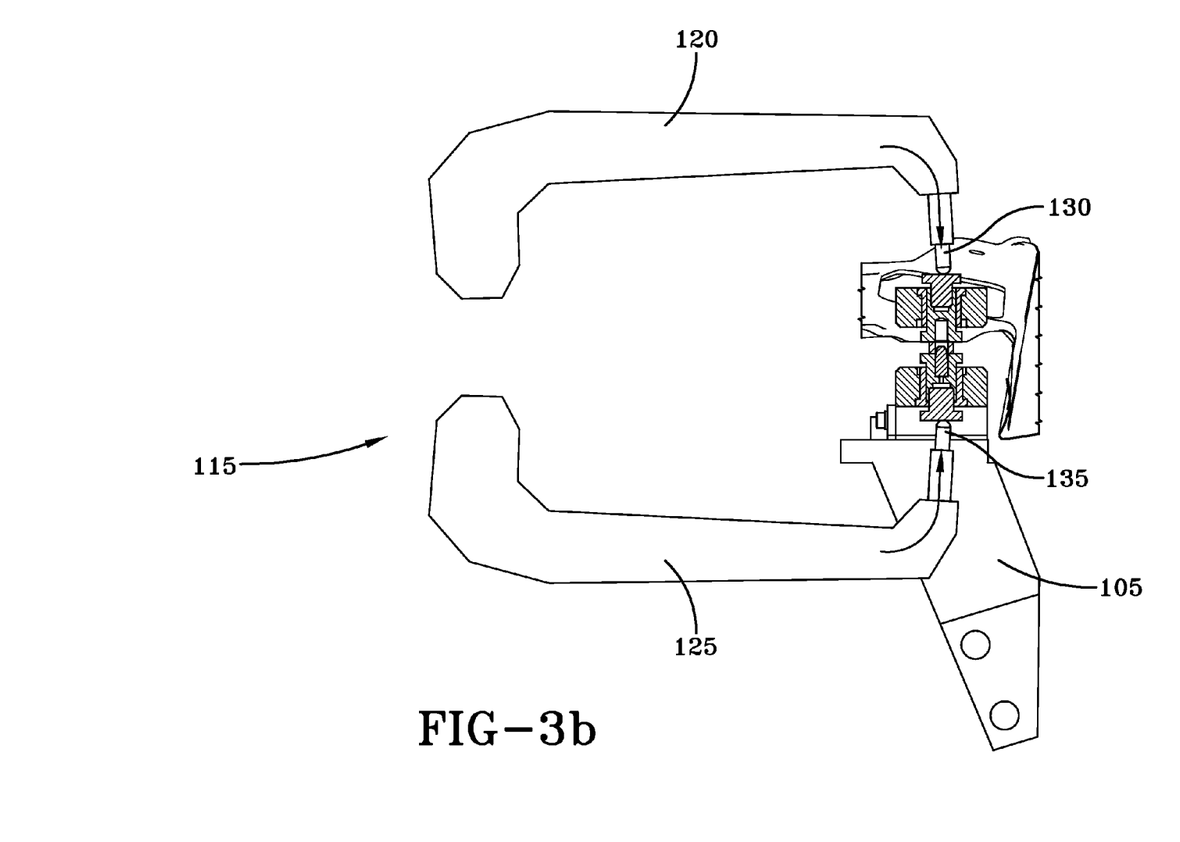
FIG. 3b shows the gun arms and gun arm electrodes of FIG. 4a located in a welding position.

An electrode assembly and welding system and method of the present invention are designed to simplify the welding of projection weld nuts to a work piece, and also to allow such a system to be easily and economically adapted for use with dissimilar work pieces. One exemplary and simplified embodiment of a system of the present invention is illustrated in FIGS. 2-3b and generally includes a work piece fixture 20 (see FIG. 2) for supporting a work piece 25 (in this example, a vehicle body panel) without assistance from an operator, one or more upper electrode assemblies 30 and one or more lower electrode assemblies 65. A system of the present invention also includes one or more lower electrode assembly supports 105 for supporting and positioning each lower electrode assembly 65 present, and one or more upper electrode assembly support members 145 (see FIG. 4) that may also be provided to locate and support each upper electrode assembly 30. A weld gun(s) 115, such as a servo weld gun, is also provided to apply the necessary clamping pressure and the welding current necessary to weld the projection nut(s) 110 to the work piece 25. The weld gun(s) may be manipulated by a welding robot or other automated means.

The upper electrode assembly 30 includes an upper weld electrode 35 for contacting the work piece 25 (or possibly a weld nut in other embodiments). The upper electrode assembly 30 also includes an upper contacting electrode 40 that is provided for contact with a corresponding gun arm electrode 120 of a weld gun 115 (see FIGS. 3a-3b) and for transferring welding current from the weld gun 115 and upper weld electrode 35 to the work piece 25 and a projection weld nut 110.

As can be most clearly observed in FIG. 2, the upper weld electrode 35 is installed within an upper electrode mounting block 50. Preferably, the position of the upper electrode mounting block 50 can be adjusted, more preferably, in three directions.

The upper weld electrode 35 is preferably separated from direct contact with the upper electrode mounting block 50 by an insulating bushing 55. The insulating bushing 55 prevents welding current from being passed into the upper electrode mounting block 50 by the upper weld electrode 35 and/or upper contacting electrode 40. To this end, the insulating bushing 55 preferably, but not essentially, includes a flange at the contacting electrode side of the upper weld electrode 35 to help insulate the upper electrode mounting block 50 from contact with the contacting electrode 40. As such, the position of the work piece 25 may be adjusted with respect to the upper electrode mounting block 50 without concern that inadvertent contact therebetween will result in an undesired transfer of welding current to other than the weld nut area of the work piece. A recess 60 may be provided in the upper electrode mounting block 50 to similarly assist with preventing the transfer of welding current from the upper weld electrode 35 and the upper electrode mounting block 50.

The upper contacting electrode 40 is floatingly installed within a receiving cavity 45 of the upper weld electrode 35. That is, while the upper contacting electrode 40 is firmly retained within the upper weld electrode 35, the upper contacting electrode is able to nonetheless move farther into the receiving cavity 45 as the upper contacting electrode and/or upper weld electrode wears. Consequently, electrode wear is automatically accounted for and it can be ensured that good electrode contact and welding current conductance will be maintained by the upper electrode assembly 30. The receiving cavity 45 in the upper weld electrode 35 and the mating portion of the upper contacting electrode 40 may have a tapered shape to facilitate engagement therebetween.

The lower electrode assembly 65 includes a lower weld electrode 70 for contacting a projection weld nut 110 (or possibly a work piece in other embodiments). The lower weld electrode 70 is provided with a special projection 75 (e.g., locating pin) for this purpose. The projection 75 is shaped and dimensioned to partially enter the bore in the projection weld nut 110, thereby ensuring that the projection nut is properly located before welding. The projection 75 may be provided in the lower weld electrode 70 by any known means, such as by threaded engagement of a locating pin. Such a locating pin may be an insulated pin, as would be known in the art. A relief aperture 155 may be provided in the upper weld electrode 35 to prevent damage to or breakage of the locating pin or other projection 75 if a weld nut 110 fails to be loaded thereto prior to a welding operation.

The lower electrode assembly 65 also includes a lower contacting electrode 80 that is provided for contact with a corresponding gun arm electrode 125 of the weld gun 115 and for transferring welding current from the weld gun and lower weld electrode 70 to the work piece 25 and the projection weld nut 110.

The lower weld electrode 70 is installed within a lower electrode mounting block 90. As with the upper electrode mounting block 50, the position of the lower electrode mounting block 90 can preferably be adjusted, more preferably, in three directions.

The lower weld electrode 70 is preferably separated from direct contact with the lower electrode mounting block 90 by an insulating bushing 95. The insulating bushing 95 prevents welding current from being passed into the lower electrode mounting block 90 by the lower weld electrode 70 and/or lower contacting electrode 80. To this end, the insulating bushing 95 preferably, but not essentially, includes a flange at the contacting electrode side of the lower weld electrode 70 to help insulate the lower electrode mounting block 90 from contact with the lower contacting electrode 80. As such, the position of the work piece 25 may be adjusted with respect to the lower electrode mounting block 90 without concern that inadvertent contact therebetween will result in an undesired transfer of welding current to other than the weld nut area of the work piece. A recess 100 may be provided in the lower electrode mounting block 90 to similarly assist with preventing the transfer of welding current from the lower weld electrode 70 and the lower electrode mounting block 90.

The lower contacting electrode 80 is floatingly installed within a receiving cavity 85 of the lower weld electrode 70. As described above with respect to the upper contacting electrode 40 this installation technique allows the lower contacting electrode 80 to move farther into the receiving cavity 85 of the lower weld electrode 70 as the lower contacting electrode and/or lower weld electrode wears. Consequently, electrode wear is again automatically accounted for and it can be ensured that good electrode contact and welding current conductance will be maintained by the lower electrode assembly 65. The receiving cavity 85 in the upper lower electrode 70 and the mating portion of the lower contacting electrode 80 may again have a tapered shape to facilitate engagement therebetween.

Individual or combined upper electrode assembly support members (not shown for reasons of clarity) may be provided to locate and support each upper electrode assembly 30 of a welding system. As would be understood by one of skill in the art, the upper electrode assembly support member(s) may be moveable, such as by pivoting or extension/retraction, in order to permit the upper electrode assembly 30 to clear the work piece 25 as the work piece is loaded onto the work piece fixture 20.

Individual or combined lower electrode assembly supports 105 are also provided to support and properly locate each lower electrode assembly 65 of a welding system. The lower electrode assembly support(s) 105 may be of various design as required to support particular lower electrode assembly shapes and sizes, and to ensure proper clearance with regard to the work piece 25. Generally, although not essentially, the lower electrode assembly support(s) 105 are stationary.

As can be understood by reference to FIGS. 3a-3b, welding of a projection weld nut 110 to the work piece 25 is accomplished according to this exemplary embodiment of the present invention by first moving the gun arms 120, 125 of the weld gun 115 into respective position near the contacting electrodes 40, 80 of the upper and lower electrode assemblies 30, 65 (see FIG. 3a). Once properly positioned with respect to the upper and lower electrode assemblies 30, 65, the gun arms 120, 125 are rotated toward a welding position, such that a first gun arm electrode 130 contacts the upper contacting electrode 40 and a second gun arm electrode 135 contacts the lower contacting electrode 80.

This inward movement of the weld gun arms 120, 125 presses the projection nut 110 tightly against the work piece 25, applying the pressure customary to a resistance welding process. In the case where the projection weld nut may have been incorrectly positioned on the lower weld electrode 70, the pressure applied by the gun arms 120, 125 also forces the projection weld nut 110 into proper position with respect to the work piece 25.

In operation, the welding process typically begins with the loading of a projection weld nut 110 onto the lower weld electrode 70. The projection 75 (described above) or a similar element is preferably provided to ensure the proper location of the projection weld nut 110. The work piece 25 is then loaded onto the work piece fixture 20 to overlie the weld nut 110. Once the work piece 25 has been properly loaded to the work piece fixture 20, the upper electrode assembly support member may be moved into proper welding position so as to bring the upper weld electrode 35 of the upper electrode assembly 30 into contact with the work piece 25. This movement of the upper electrode assembly support member may be accomplished by any number of mechanisms that would be familiar to one skilled in the art, and need not be described in detail herein.

With the upper and lower electrode assemblies 30, 65 properly positioned, a welding robot or other motive device is used to advanced the weld gun 115 toward the work piece 25 with the weld gun arms 120, 125 in a deactivated position (although it should be realized that movement of the welding robot may actually start earlier in order to reduce cycle time). The weld gun arms 120, 125 are positioned such that the electrodes 130, 135 associated therewith are aligned with the corresponding upper and lower contacting electrodes 40, 80. Activation (closing) of the gun arms 120, 125, such as by a servo device, subsequently results in the gun arm electrodes 130, 135 contacting the upper and lower contacting electrodes 40, 80.

With the gun arm electrodes 130, 135 in contact with the upper and lower contacting electrodes 40, 80 and the upper and lower weld electrodes 35, 70 in contact with the work piece 25 and projection weld nut 110, electric current is then passed from the gun arm electrodes through the projection nut and work piece. The electric current is sufficient to melt the material projections of the projection weld nut 110 and to weld the projection weld nut to the work piece 25. If other projection weld nuts 110 are present on the work piece 25, the weld gun is moved sequentially therebetween repeating the described welding process. Once welding of all projection weld nuts is complete, the weld gun is withdrawn to a waiting (home) position and the fixtured work piece 25 is removed by an operator (or a robot). A new welding cycle can then be initiated.

In contrast to the embodiments shown in the drawing figures and described above, the lower electrode assembly may be moved into position much like the upper electrode assembly and support member in the previously described exemplary embodiment. When necessary, an aperture or other point of access may be provided in a work piece fixture to allow for entry of a moveable lower electrode assembly support.

While the exemplary embodiment shown herein has been described using the terms "upper" and "lower", it is to be understood that such terminology has been used for purposes of illustration and convenience of identification only. That is, nothing herein is to be construed as limiting the present invention to a system having electrode assemblies with an actual upper and lower arrangement. For example, the electrode assemblies may be oriented in some other fashion relative to the ground.

Although the present invention has been specifically explained with respect to certain exemplary embodiments where the welding of only one projection weld nut is shown, it should be understood by one skilled in the art that a system and method of the present invention can be used to weld a plurality of projection weld nuts to a work piece. In such a case, a single weld gun, or a number of weld guns, may be used to make contact with a number of individual electrode assemblies associated with the various projection weld nuts.

Figure 4:
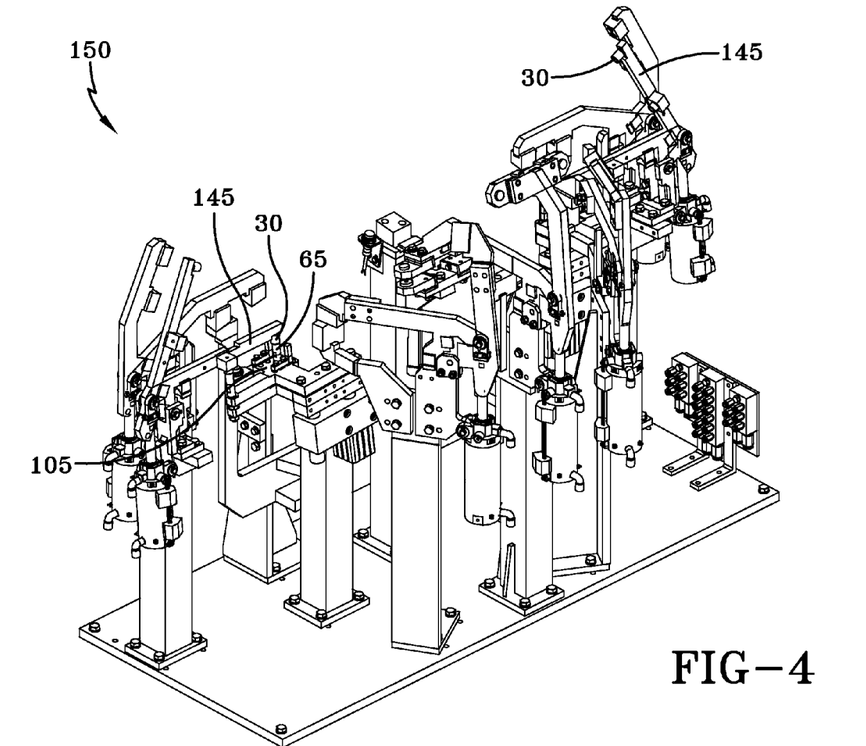
FIG. 4 represents an automated system for welding a projection weld nut to a metallic work piece that could benefit from utilization of an electrode assembly of the present invention, the system having a plurality of dedicated welding pedestals provided to weld a like number of weld nuts to a work piece.

Such a system is illustrated in the exemplary embodiment 150 illustrated in FIG. 4. Dedicated upper and lower electrode assemblies 35, 65 as described above may be provided for each projection weld nut present. In this case, a weld gun can simply be moved from one projection weld nut to another until welding is completed. Alternatively, it may be possible to employ moveable upper and lower electrode assemblies so as to minimize the number of such electrode assemblies required. In this latter case, at least certain of the upper and lower electrode assemblies may also move from one projection weld nut to another along with the weld gun. Other variations are also possible. Stationary lower electrode assembly supports 105 and movable upper electrode assembly supports 145 can also be seen in FIG. 4.

From the foregoing description, it can be understood that there are various ways to construct such a projection weld nut welding system while still falling within the scope of the present invention. As such, while certain embodiments of the present invention are described in detail above, the scope of the invention is not to be considered limited by such disclosure, and modifications are possible without departing from the spirit of the invention as evidenced by the following claims:

What is claimed is:

1. An electrode apparatus for use in welding a projection weld nut to a work piece, comprising:
    a first electrode assembly including an electrode mounting block, a weld electrode disposed in said mounting block, a first end of said weld electrode extending from a welding side of said mounting block for contact with a work piece, an insulating bushing separating said weld electrode from direct contact with said mounting block, and a contacting electrode floatingly installed into a receiving cavity located in a second end of said weld electrode, said contacting electrode provided for contact by a first gun arm electrode of a weld gun;
    a second electrode assembly for working in conjunction with said first electrode assembly to weld a projection weld nut to said work piece, said second electrode assembly including an electrode mounting block, a weld electrode disposed in said mounting block, a first end of said weld electrode extending from a welding side of said mounting block for contact with a projection weld nut, an insulating bushing separating said weld electrode from direct contact with said mounting block, and a contacting electrode floatingly installed into a receiving cavity located in a second end of said weld electrode, said contacting electrode provided for contact by a second gun arm electrode of said weld gun;
    a first electrode assembly support member for retaining and supporting said first electrode assembly;
    a second electrode assembly support member for retaining and supporting said second electrode assembly;
    wherein at least one of said first and second electrode assembly support members are movable to permit insertion of said work piece and said weld nut between said electrode assemblies; and
    wherein, during a welding operation, said work piece and said weld nut are trapped in abutting contact between said weld electrodes of said first and second electrode assemblies while said weld gun applies pressure thereto and transfers electric current therethrough to weld said projection weld nut to said work piece.

2. The electrode apparatus of claim 1, wherein the position of said mounting blocks is adjustable.

3. The electrode apparatus of claim 2, wherein the position of said mounting blocks is adjustable in three directions.

4. The electrode apparatus of claim 1, wherein each insulating bushing is flanged along the second end of its associated weld electrode so as to insulate against contact of said weld electrode with the mounting block of the respective electrode assembly.

5. The electrode apparatus of claim 1, wherein the receiving cavity of each weld electrode and the mating portion of each contacting electrode has a tapered shape.

6. The electrode apparatus of claim 1, further comprising a projection extending from the welding end of said weld electrode of said second electrode assembly, said projection for properly locating said projection weld nut by engaging a bore therein.

7. The electrode apparatus of claim 6, wherein said projection is formed by a locating pin.

8. The electrode apparatus of claim 1, further comprising a recess located in a welding side of each electrode assembly mounting block, said recess for preventing contact between the associated weld electrode and said mounting block.

9. A system for welding a projection weld nut to a work piece, comprising:
    a work piece fixture for supporting said work piece during welding;
    a first electrode assembly including an electrode mounting block, a weld electrode disposed in said mounting block, a first end of said weld electrode extending from a welding side of said mounting block for contact with said work piece, an insulating bushing separating said weld electrode from direct contact with said mounting block, and a contacting electrode floatingly installed into a receiving cavity located in a second end of said weld electrode, said contacting electrode provided for contact by a first gun arm electrode of a weld gun;
    a second electrode assembly for working in conjunction with said first electrode assembly to weld a projection weld nut to said work piece, said second electrode assembly including an electrode mounting block, a weld electrode disposed in said mounting block, a first end of said weld electrode extending from a welding side of said mounting block for contact with a projection weld nut, an insulating bushing separating said weld electrode from direct contact with said mounting block, and a contacting electrode floatingly installed into a receiving cavity located in a second end of said weld electrode, said contacting electrode provided for contact by a second gun arm electrode of said weld gun;
    a first electrode assembly support member for retaining and supporting said first electrode assembly;
    a second electrode assembly support member for retaining and supporting said second electrode assembly; and
    said weld gun having a pair of gun arms each possessing a weld electrode, said gun arms adapted to press each weld electrode against a corresponding one of said contacting electrodes of said first and second electrode assemblies, thereby trapping said projection weld nut and said work piece in pressed contact between said weld electrodes of said first and second electrode assemblies;
    wherein electric current is thereafter transferred from said weld gun weld electrodes to said projection weld nut and said work piece via said weld electrode and contacting electrode of said electrode assembly, thereby effecting welding of said projection weld nut to said work piece.

10. The system of claim 9, wherein said second electrode assembly is a part of said work piece fixture.

11. The system of claim 9, wherein the position of said electrode assembly mounting blocks is adjustable.

12. The system of claim 11, wherein the position of said mounting blocks is adjustable in three directions.

13. The system of claim 9, wherein each electrode assembly insulating bushing is flanged along the second end of its associated weld electrode so as to insulate against contact of said weld electrode with the mounting block of the respective electrode assembly.

14. The system of claim 9, wherein the receiving cavity of each weld electrode and the mating portion of each contacting electrode has a tapered shape.

15. The system of claim 9, further comprising a locating projection extending from the welding end of said weld electrode of said second electrode assembly, said projection for properly locating a projection weld nut by engaging a bore therein.

16. The system of claim 9, further comprising a recess located in a welding side of each electrode assembly mounting block, said recess for preventing contact between the associated weld electrode and said mounting block.

17. The system of claim 9, wherein said weld gun is carried on a resistance welding robot.

* * * * *